United States Patent [19]
Shinomiya et al.

[11] Patent Number: 6,060,527
[45] Date of Patent: May 9, 2000

[54] METHOD OF RECOVERING RESIN

[75] Inventors: Hiromasa Shinomiya; Hideki Nakahiro; Tomohiro Nakado, all of Tokyo, Japan

[73] Assignee: Teijin Chemicals Ltd, Tokyo, Japan

[21] Appl. No.: 09/171,231

[22] PCT Filed: Apr. 10, 1997

[86] PCT No.: PCT/JP97/01239

§ 371 Date: Oct. 15, 1998

§ 102(e) Date: Oct. 15, 1998

[87] PCT Pub. No.: WO97/39868

PCT Pub. Date: Oct. 30, 1997

[30] Foreign Application Priority Data

Apr. 19, 1996 [JP] Japan ..................................... 8-097970

[51] Int. Cl.⁷ ................................ C08J 11/04; C08J 3/00; C08F 6/00; C08G 64/00
[52] U.S. Cl. .......................... 521/40; 264/911; 528/499; 528/502 R; 528/502 C; 528/503
[58] Field of Search .............................. 521/40; 264/911; 528/499, 502 R, 502 C, 503

[56] References Cited

U.S. PATENT DOCUMENTS

| | | |
|---|---|---|
| 5,151,452 | 9/1992 | Fennhoff et al. . |
| 5,203,067 | 4/1993 | DeFazio . |
| 5,214,072 | 5/1993 | Fennhoff et al. . |
| 5,306,349 | 4/1994 | Nee . |

FOREIGN PATENT DOCUMENTS

| | | |
|---|---|---|
| 5200379 | 8/1993 | Japan . |
| 5210873 | 8/1993 | Japan . |
| 5345321 | 12/1993 | Japan . |
| 6-63942 | 3/1994 | Japan . |
| 6223416 | 8/1994 | Japan . |
| 7205154 | 8/1995 | Japan . |
| 4305414 | 10/1995 | Japan . |
| 7256639 | 10/1995 | Japan . |
| 7286064 | 10/1995 | Japan . |
| WO9401491 | 1/1994 | WIPO . |
| WO9406608 | 3/1994 | WIPO . |

*Primary Examiner*—Patrick D. Niland

[57] ABSTRACT

A process for recovering the resin contained in optical information recording media having either a thin metal film layer or a printed coating film layer, coated on at least one side of a resin substrate,
which comprises the following steps of:

(1) rolling the recording media,
(2) bringing the rolled recording media into contact with hot water,
(3) separating the coating film peeled from the recording media,
(4) grinding the resulting recording media,
(5) bringing the obtained small pieces of the recording media into contact with hot water to detach the thin metal film component, and
(6) separating the detached thin metal film component from the small pieces of the recording media to recover and obtain the small pieces of the recording media.

With this process, the coating layer can be removed effectively from the optical information recording media and the resin component in the recording media can be selectively recovered advantageously in industry.

25 Claims, No Drawings

METHOD OF RECOVERING RESIN

TECHNICAL FIELD

The present invention relates to a process for recovering a resin as a substrate contained in optical information recording media coated with a thin metal film layer and a printed coating film layer. More particularly, it relates to a process for selectively removing the thin metal film layer and the printed coating film layer from the above optical information recording media and recovering the resin component as a substrate for recycling.

PRIOR ART

There have been developed and made commercially available various optical information recording media such as those using a mode of regenerating sounds or images by detecting the fine unevenness formed at the surface of the disc substrate by means of a laser beam, those using a mode of recording and regenerating information based on the information recording layer formed on the substrate, those using a mode of enabling the recorded information to be erased or overwritten, and those having increased memory capacity by laminating any of the substrates used in the above media. These information recording media must have a large and extremely high-density memory capacity and be of high quality. Therefore, they must be treated as defective when even a very small defect is found. Moreover, the test samples taken out from various steps of production process for the verification of high quality are inevitably large in number. In particular, compact discs for replay only are produced in a large number, and disposal of a large number of resin plates including test samples, defectives and products recovered from market raises a problem.

These recording media have been produced using transparent resins such as polycarbonate resin, polymethyl methacrylate resin, amorphous cyclic polyolefin resin and the like. Of these, the polycarbonate resin is used in most of compact discs and in a large scale production. On the other hand, the use of the polycarbonate resin also produces a large number of test samples, defectives, etc. In disposing these test samples, defectives, etc., transparent optical substrates before neither an information recording layer nor a reflecting layer is applied can be ground or re-pelletized to be mixed with an ordinary polycarbonate resin or with its alloy with other resins for proper recycling. However, in the case of the resin plates on which an information recording layer, a reflecting layer, a protective coat layer such as UV coat, and an adhesive layer for lamination (may be referred to as "coated resin plates" hereinafter) are formed, its recycling is significantly restricted. For example, in the case of a resin plate having a UV coat layer formed thereon, since the UV coat layer is incompatible with polycarbonate resins, mere mixing of said resin plate with an ordinary polycarbonate resin and molding of the mixture gives a molded product having surface unevenness and very bad appearance. In the case of a laminated resin plate, since the adhesive used therein has thermal stability inferior to that of the resin used therein, there may arise, when reused, deterioration of color and reduction in resin molecular weight.

Therefore, proposals were made with an aim of selectively removing the information recording layer, the reflecting layer and the protective coat layer from a coated resin plate and recovering the resin itself of the plate.

Some of these proposals are described below.

(i) Japanese Laid-Open Patent Applications Nos. 4-305414 (European Patent No. 476,475, U.S. Pat. No. 5,151,452), 5-200379 (European Patent No. 537,567, U.S. Pat. No. 5,214,072) and 6-223416 (European Patent No. 601,719, U.S. Pat. No. 5,306,349)

The methods disclosed in these literatures are a method which comprises treating a coated resin plate chemically with, for example, an aqueous solution of an acid or an alkali, that is, a method which comprises dissolving the metal portion of the information recording layer and reflecting layer of a coated resin plate and thereby removing the UV coat layer and the label printing layer. The method has had a drawback in that the removal of the UV coat layer and the label printing layer is impossible at the portion of a coated resin plate containing no metal or in resin plates having been subjected to coating test, label printing test or the like. Further, in the method, neutralization after treatment and neutralization of waste water are necessary, and an increase in running cost has been inevitable.

(ii) Japanese Laid-Open Patent Application No. 5-345321

The method disclosed in the above literature is a method which comprises immersing a coated resin plate in hot water for a long period of time. The method is superior in that the neutralization required in the above method is unnecessary. In this method, however, since the resin plate is immersed in hot water for a long period of time, reduction in molecular weight and whitening tend to occur in the case of a polycarbonate resin substrate, and the method has not been favorable for reuse of recovered resin.

(iii) Japanese Laid-Open Patent Application No. 5-210873 and U.S. Pat. No. 5,203,067

The methods disclosed in these literatures are a method which comprises cutting and polishing the surface of the coating layer of a coated resin plate mechanically with an edged tool or an abrasive to remove the coating layer. In the method, there are needed a device for reading the cutting surface and a device for reversing the cutting side of resin plate. Therefore, the initial investment cost is large and the cutting reduces the recovery (%) of resin. These demerits have made impossible the wide use of the method. Recently, a technique of laminating two thin resin plates with each other has been developed for increased memory capacity. However, in such a laminated resin plate, polishing is impossible because the resin is present at the outer surface and this poses a new problem.

Problem that the Invention Tries to Solve

The above-mentioned methods for resin recovery from coated resin plate are not satisfactory economically and industrially and, from the standpoint of resin reuse, have been unacceptable in quality and recovery rate. Particularly when the molded product obtained from a recovered resin must have transparency and high quality, the conventional methods have been inadequate.

None of the hitherto proposed methods is practical. Therefore, the resin plates used as test samples, the resin plates regarded as defectives and the recovered resin plates are mostly disposed as an industrial waste. This is a serious problem in view of the future increase in optical information recording media and particularly in view of the effective utilization of resources and the preservation of global environment.

Hence, it is the first object of the present invention to provide an industrially advantageous process that can remove a coating layer from optical information recording media effectively and recover a resin component selectively.

It is the second object of the present invention to provide a process that can recover the resin substrate from optical information recording media without substantially deteriorating the resin in quality and without substantially having the coating layer.

It is the third object of the present invention to provide a pollution-free and environment-preserving process for separating the resin component and the coating layer component from optical information recording media.

It is the fourth object of the present invention to provide a process, particularly a continuous process, for recovering the resin component in a large volume from optical information recording media using a compact apparatus.

It is another object of the present invention to provide a process for recovering the resin from optical information recording media and recycling the resin.

Means for Solving the Problem

According to the studies conducted by the present inventors, it has been found that the above objects of the present invention can be achieved by:

a process for recovering the resin contained in optical information recording media having either a thin metal film layer, a printed coating film layer, or a layer comprising a thin metal film and a printed coating film, coated on at least one side of a resin substrate, which comprises the following steps of:

(1) passing the recording media between at least one pair of rollers to roll them (step A), (2) bringing the rolled recording media into contact with hot water (step B), (3) separating a substantial amount of the coating film peeled from the recording media (step C), (4) grinding the obtained recording media (step D), (5) bringing the obtained small pieces of the recording media into contact with hot water to detach the thin metal film component (step E), and (6) separating the detached thin metal film component and the hot water from the small pieces of the recording media to recover and obtain the small pieces of the recording media (step F).

The process of the present invention will be described in more detail hereinafter.

In the present process, the optical information recording media to be subjected to resin recovery, use a resin capable of transmitting an infrared light or a visible light, as the material for the substrate. Such a resin includes one which contains a dye or the like and which has a color such as black, gold or the like. On one side of the resin or in the center of the sandwich structure obtained by laminating two sheets of the resin is formed a coating layer. As mentioned previously, this resin having a coating layer may be a sample used for testing or a defective, both generated in the production steps of said resin, or may be a recovered product. Said resin may partially contain a resin substrate having no coating layer.

There is no particular restriction as to the thickness of the resin substrate as long as it is the one that can be used in ordinary recording media. The thickness, however, is generally 0.5 to 3 mm, preferably 0.6 to 2 mm. In the case of a laminated resin substrate, the thickness thereof is not particularly restricted as long as the total thickness is in the above range. The shape of the resin substrate is preferably a disc-shaped flat plate molded by injection molding. The disc-shaped resin substrate can be directly subjected to the resin recovery process of the present invention.

On the surface of the resin substrate is generally formed a thin metal film made of Al, Te, Fe, Co, Gd, SiN, ZnS—$SiO_2$, GeSbTe, ZnS, Al alloy or the like. Of these, Al is suitable. The thin metal film can be formed by means of sputtering, deposition or the like. The thin metal film has a thickness of generally 0.04 to 2 $\mu$m, and it is coated with a protective film. As the protective film, a UV coat film made of an acrylic resin is generally used and has a thickness of 5 to 10 $\mu$m.

A printed coating film layer is further formed on the resin substrate, directly or via the above thin metal film. This printed coating film layer is generally called "label printing layer" and has a thickness of generally 5 to 30 $\mu$m, preferably 10 to 25 $\mu$m. As the coating forming the printed coating film layer, there is used, for example, an acrylic coating, an acrylic-vinyl coating, a vinyl coating, a polyester coating, a melamine coating, an epoxy coating or a urethane coating. As the adhesive used for lamination of two resin plates can be mentioned, for example, an acrylic-based adhesive, an epoxy-based adhesive and a urethane-based adhesive. They are used as an adhesive of UV-curing type or hot-melt type.

As mentioned previously, in the present invention, a resin substrate on which a thin metal film layer (including a protective coat layer formed thereon), or a printed coating film layer, or a thin metal film layer and a printed coating film layer (all of these layers have been explained above) have been formed as a coating layer, is subjected to resin recovery. According to the present invention, it is possible to remove, from the above-mentioned coated resin substrate, the coating layer substantially to selectively recover the resin component of the substrate. In the present invention, hereinafter, both of a substrate having a coating layer, used in information recording medium and a coating-layer-removed substrate are generically called "resin substrate" in some cases. Further, a resin substrate which has been ground, is called "small pieces of substrate" in some cases.

Specific examples of the coated resin substrate include those for medium for replay only such as ROM discs exemplified by compact disc, mini disc, laser disc and the like; those for medium for recording and replay such as DRAM discs exemplified by CD-R, write-once disc and the like; and those for rewritable medium such as optical discs of E-DRAW exemplified by photomagnetic disc, phase change optical disc and the like. These optical discs include a one-side memory type and a two-sheet lamination type used as a DVD.

The process of the present invention is superior particularly in selectively recovering the resin component contained in a recording medium having, at the surface, a thin aluminum film layer (as a thin metal film layer) and further, on part of the layer, a printed coating film layer, the recording medium being preferably a compact disc or a DVD.

The resin constituting the resin substrate can be a light-transmitting resin. As such a resin, there is generally used a polycarbonate resin, a polymethyl methacrylate resin, an amorphous cyclic polyolefin resin, or the like. Of these, the polycarbonate resin or the polymethyl methacrylate resin is preferred, and the polycarbonate resin is most preferred.

The polycarbonate resin can be any as long as it is generally used as a molded material of a thermoplastic aromatic polycarbonate resin. It is generally produced by reacting a dihydric phenol with a carbonate precursor by a solution process or by a melt process, and products produced by these processes can be used for the same effect.

Representative examples of the dihydric phenol used for the production of the aromatic polycarbonate resin include hydroquinone, resorcinol, 4,4'-dihydroxydiphenyl, bis-(4-hydroxyphenyl)methane, 1,1-bis-(4-hydroxyphenyl)ethane, 2,2-bis-(4-hydroxyphenyl)propane (generally called "bisphenol A"), 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, α,α'-bis-(4-hydroxyphenyl)-o-diisopropylbenzene, α,α'-bis-(4-hydroxyphenyl)-m-diisopropylbenzene, α,α'-bis-(4-hydroxyphenyl)-p-diisopropylbenzene, 2,2-bis-(3-methyl-4-hydroxyphenyl)-propane, 2,2,-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, 2,4-bis-(3,5-dimethyl-4-hydroxyphenyl)-2-methylbutane, 1,1-bis-(3,5-dimethyl-4-hydroxyphenyl)-cyclohexane, 1,1-bis-(3,5-dimethyl-4-hydroxyphenyl)-3,3,5-trimethylcyclohexane, α,α'-bis-(3,5-dimethyl-4-hydroxyphenyl)-o-diisopropylbenzene, α,α'-bis-(3,5-dimethyl-4-hydroxyphenyl)-m-diisopropylbenzene, α,α'-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane, bis-(4-hydroxyphenyl)-sulfone, bis-(4-hydroxyphenyl)-sulfide, bis-(4-hydroxyphenyl)-ether, bis-(4-hydroxyphenyl)-ketone and bis-(4-hydroxyphenyl)-sulfoxide. These dihydric phenols may be used alone or in admixture of two or more kinds.

Of these, preferably used are a homopolymer of bisphenol A; and copolymers obtained from at least two kinds of bisphenols selected from 1,1-bis-(4-hydroxyphenyl)-cyclohexane, 1,1-bis-(4-hydroxyphenyl)-3,3,5-trimethylcyclohexane, α,α'-bis-(4-hydroxyphenyl)-m-diisopropylbenzene, 2,2-bis-(3-methyl-4-hydroxyphenyl)-propane, 2,2-bis-(3,5-dimethyl-4-hydroxyphenyl)-propane, 2,2-bis-(3,5-dichloro-4-hydroxyphenyl)-propane and 2,2-bis-(3,5-dibromo-4-hydroxyphenyl) -propane, and particularly preferably used are copolymers of 1,1-bis-(4-hydroxyphenyl)-3,3,5-trimethylcyclohexane, bisphenol A and either α,α'-bis-(4-hydroxyphenyl)-m-diisopropylbenzene or 2,2-bis-(3-methyl-4-hydroxyphenyl)-propane.

As the carbonate precursor, there can be mentioned carbonyl halides, carbonate esters, haloformates and the like. Specific examples thereof include phosgene, diphenyl carbonate, dihaloformates of dihydric phenols, and mixtures thereof. In producing a polycarbonate resin, there can appropriately be used a molecular weight-controlling agent, a branching agent, a catalyst for promoting reaction, and the like in accordance with a commonly used method. It is possible to use the thus obtained aromatic polycarbonate resins in combination of two or more.

The above polymethyl methacrylate resin is obtained by polymerizing a methyl methacrylate monomer as a main raw material. In optical applications, a homopolymer is generally used; however, there can also be used a copolymer obtained by copolymerizing a methyl methacrylate monomer with 10 mole % or less of other copolymerizable monomers such as acrylates exemplified by methyl acrylate, ethyl acrylate, propyl acrylate and butyl acrylate or methacrylates exemplified by ethyl methacrylate, propyl methacrylate or butyl methacrylate.

There is no particular restriction as to the polymerization method for obtaining the polymethyl methacrylate resin. There can be used bulk polymerization, suspension polymerization, solution polymerization, emulsion polymerization or the like.

As the above amorphous cyclic polyolefin resin, there can be used a hydrogenation product of a ring-opening polymer of a norbornene-based monomer, for example. Illustrative examples of the norbornene-based monomer include norbornene, dimethanooctahydronaphthalene, trimethanododecahydroanthracene, and alkyl- or alkylidene-substituted products thereof; and dicyclopentadiene, 2,3-dihydrodicyclopentadiene, dimethanooctahydrobenzoindene, dimethanodecahydrobenzoindene, dimethanodecahydrofluorene, and alkyl-substituted products thereof. The norbornene-based monomer may have a polar substituent such as halogen atom, ester-type residue, ether-type residue, cyano group or the like. Of these monomers, monofunctional monomers are preferably used because injection-molding is difficult to conduct with di- or higher functional monomers.

These norbornene-based monomers can be used alone or in combination of two or more.

It is possible to use, as a copolymer component, other cycloolefins such as cyclopropene, cyclobutene, cyclopentene, cycloheptene, cyclooctene, 5,6-dihydrodicyclopentadiene or the like, in an amount of generally 30% by weight or less.

It is also possible to use an acyclic olefin as a molecular weight-controlling agent, and an α-olefin such as 1-butene, 1-pentene, 1-hexene or the like is particularly preferred.

The ring-opening polymer of a norbornene-based monomer can be produced by ordinary polymerization of a norbornene. Preferably, a known metathesis catalyst is used as a polymerization catalyst. Preferred as the metathesis catalyst is a catalyst system comprising a transition metal compound such as titanium tetrahalide and an organometal such as organic aluminum compound, or a catalyst system which is a combination of the above catalyst system and a third component such as aliphatic or aromatic tertiary amine.

The ring-opening polymerization is possible without using any solvent. It is, however, generally conducted in an inert organic solvent such as aromatic hydrocarbon exemplified by benzene, toluene or xylene; aliphatic hydrocarbon exemplified by hexane or heptane; alicyclic hydrocarbon exemplified by cyclohexane; halogenated hydrocarbon exemplified by dichloroethane; or the like. In general, the polymerization temperature is selected from the range of −20 to 100° C. and the polymerization pressure is selected from the range of 0 to 50 kg/cm$^2$.

The ring-opening polymer of a norbornene-based monomer desirably has a Tg of 120 to 200° C. in order for its hydrogenation product to be used as a material for transparent optical substrate.

The hydrogenation product of a ring-opening polymer of norbornene-based monomer can be produced by using a known hydrogenation catalyst.

The hydrogenation catalyst can be any catalyst generally used in hydrogenation of an olefin compound. Illustrative examples thereof include Wilkinson TS complex, cobalt acetate/triethyl aluminum, nickel acetylacetonate/triisobutyl aluminum, palladium-carbon, ruthenium-carbon, nickel-diatomaceous earth and the like.

The hydrogenation reaction is conducted in a homogeneous or non-homogeneous system, depending upon the kind of the catalyst used, at 0 to 250° C. and a hydrogen pressure of 200 atm.

The degree of hydrogenation is preferably 95% or higher, more preferably 99% or higher from the viewpoint of the resistance to thermal deterioration, resistance to photodeterioration, etc. of the hydrogenation product.

An addition polymer of a norbornene-based monomer can also be mentioned as an example of the amorphous cyclic polyolefin resin. A homopolymer of a norbornene-based monomer may also be used, but a copolymer of said monomer with ethylene is preferably used. Such a norbornene-based monomer can be the same as mentioned previously.

In the present invention, the above coated resin substrate per se is subjected to the step A to the step F, whereby the coating layer of the resin substrate can be removed and separated from the resin substrate and the resin component of the resin substrate can be isolated and recovered.

Each of the above steps will be explained hereinafter.

Step A

This is a step of rolling coated resin substrates by passing them between at least one pair of rollers. In this rolling step, the resin substrates are rolled by the rollers to a length of 1.08 to 2.0 times, preferably 1.1 to 1.8 times the original lengths of the resin substrates. The desirable gap between the rollers is 0.05 to 0.8 times, preferably 0.1 to 0.7 times the original thicknesses of the resin substrates so that the resin substrates can be rolled to a length of the above-mentioned range. Desirably, the temperature of the rollers is maintained at 30 to 140° C., preferably at 60 to 130° C. One to three pairs of rollers may be used. It is possible to roll the resin substrates several times with only one pair of rollers.

When one pair of rollers is used, they rotate generally in opposite directions. They may rotate at the same or different circumferential speed, or at different circumferential speeds. In the latter case, the high circumferential speed may be about 1.05 to 2 times the low circumferential speed. In the present invention, however, the circumferential speeds of one pair of rollers in the step A are not necessarily different and may be substantially the same. Nevertheless, a difference in circumferential speed between one pair of rollers can produce a shear more easily and is advantageous in some cases. There is no particular restriction as to the difference in circumferential speed; however, the difference is preferably 1 cm/sec or more, particularly preferably 3 to 10 cm/sec when the gap between two rollers is 0.1 to 0.7 mm. The difference of larger than 15 cm/sec is not preferred because it produces extreme warpage which makes the rolled resin substrates difficult to handle in the subsequent steps. Although larger times of rolling give a better result, in most cases, several times of rolling give a sufficient result. It is advantageous to roll the resin substrates in multiple directions rather than in one direction because it makes peeling easier. It is also advantageous to heat the rollers and keep the surface temperature of the rollers at a temperature not higher than the glass transition temperature of the resin because it reduces the pressure required at the rolling and extends the life of rollers.

The rollers used may be those used industrially, and need not be special rollers as long as they are made of a material which is basically harder than the resin substrates to be rolled and which is not deformed. As the material, there can be mentioned, for example, steel, plated steel and stainless steel. Of these, stainless steel is preferred from the view point of the rust prevention.

The surfaces of rollers may be a mirror surface, a pear-skin surface or an uneven surface. Rollers with a mirror surface are generally used.

In the step A, it is necessary to roll resin substrates in their lengthwise directions, and it is not necessary to apply a stress to the surfaces of the resin substrates, particularly the coating layers and the resin substrates.

Step B

The resin substrates obtained in the step A (may be referred to as "rolled resin substrates" hereinafter) are brought into contact with hot water. In this step B, neither special apparatus nor special reagent is required, and a container (or a tank) of appropriate size and hot water are used.

In the step B, the rolled resin substrates obtained in the step A are brought into contact with hot water, a strain appears between each coating layer and each resin substrate, and the coating layer, particularly the printed coating film layer is peeled easily.

Therefore, it is preferred that the rolled resin substrates and the hot water are allowed to flow in the container so that they can make effective contact and moreover the resin substrates can intertwine with each other. The resin substrates repeat mutual association and separation from each other. As a result, the printed coating film layer formed on each resin substrate becomes more peelable. In that case, the peeling is promoted by the action of the hot water.

The temperature of the hot water is preferably 50 to 100° C., particularly preferably 70 to 95° C. When the temperature of the hot water is lower than 50° C., a long contact time is required and the peeling of the printed coating film layer is not conducted effectively.

On the other hand, when the temperature is higher than 100° C., the apparatus used becomes complex and expensive because pressurization is necessary, and further, there arises the deterioration of resin. In the step B, the practical contact time between hot water and resin substrate is generally 3 to 60 minutes, preferably 5 to 30 minutes.

It is sufficient that the hot water comprises water alone, but the hot water may comprise other water-soluble solvent having no solvency for the resin of resin substrate in an amount of 20% by weight or less, preferably 10% by weight or less, in addition to water. As such a solvent, alcohol, glycol or ketone can be mentioned. When the resin of resin substrate is an aromatic polycarbonate, an alcohol is preferred.

As mentioned previously, the step B is conducted in such an apparatus that the resin substrates repeat mutual association and separation from each other and contact between hot water and resin substrates is possible. Specifically, the resin substrates and the hot water are placed in a container, and stirring or rotation of the container is conducted so that the resin substrates can repeat mutual association and separation from each other and contact between hot water and resin substrates is allowed to take place in the container.

In the container in which the step B is conducted, the resin substrates can repeat mutual association and separation from each other effectively by allowing each proportion of the resin substrates and the hot water to fall in an appropriate range. Use of too large an amount of hot water achieves neither effective association and separation of resin substrates nor sufficient contact. The range is preferably 0.1 to 30% by weight, particularly preferably 0.5 to 15% by weight, most preferably 1 to 10% by weight in terms of the weight of resin substrates based on the total of resin substrates and hot water.

In a preferred embodiment of the step B, a rotary drum is placed in a container, the resin substrates and the hot water are placed in the drum, the drum is rotated, whereby the resin substrates are allowed to repeat mutual association and separation from each other and the resin substrates are brought into contact with the hot water.

Suitable as the rotary drum is one having a large number of small holes in the side wall. The small holes of the rotary drum serve to discharge therethrough the peeled small pieces of printed coating film out of the drum together with the hot water.

Use of the rotary drum is extremely effective also for continuous operation of the step B. That is, it is preferable that the rotary drum is placed in a container containing the hot water; the resin substrates are fed into the drum from one end of the drum; the drum is rotated; while the resin substrates are allowed to repeat mutual association and separation from each other in the presence of the hot water, the peeled small pieces of printed coating film are discharged out of the drum together with the hot water through a large number of the small pores formed in the side wall of the drum; the resin substrates substantially free from the printed coating film is taken out from the other end of the rotating drum.

Desirably, the rotary drum has such an internal structure that the resin substrates fed into the drum are slowly moved from one end of the drum toward the other end by the rotation of the drum. Such a structure is preferably one having a spiral-shaped diaphragm(s) inside the drum. It is possible that the drum is divided into a plurality of zones so that a certain amount of the resin substrates can stay in one zone and then is transferred into next zone and that a weir is provided between each two adjacent zones. The rotary drum may be any of a vertical type, a horizontal type and an inclination type, but a horizontal type or a mild inclination type is advantageous.

The small pieces of printed coating film discharged through the small holes formed in the side wall of the rotating drum are taken out of the container together with the hot water, the small pieces are separated from the hot water by filtration, and the hot water is returned to the container for reuse. Thus, circulation use of the hot water makes small the amount of the hot water used and, moreover, heat loss is small.

Step C

In the above step B, the printed coating film formed on each resin substrate is peeled substantially and is suspended in the hot water in the form of small pieces.

This step C is a step of separating the small pieces of coating film peeled from each resin substrate. The step C requires no special apparatus. That is, the small pieces of coating film peeled from each substrate are placed in a large amount of water or hot water present in a container and are stirred, whereby they can be separated.

The small pieces of coating film are dispersed in water or hot water and taken out of the container, whereby the small pieces can be separated from each substrate. As necessary, water or hot water may be added to the separated substrate or may be showered on the separated substrate, whereby the small pieces of coating film remaining on the substrate can be separated and removed.

The step C can be conducted in the same apparatus (container) as used for the step B, and this practice is advantageous. That is, it is advantageous to conduct the contact of rolled resin substrates with hot water (step B) and the separation of peeled small pieces of coating film (step C), in one container, and it is particularly advantageous to conduct these steps in one container continuously.

In one practice of conducting the steps B and C continuously, the step B is conducted by using an apparatus constituted by a container and a rotary drum placed in the container, as mentioned in the step B, and the step C is conducted by discharging the peeled small pieces of coating film out of the drum together with hot water through the small holes formed in the side wall of the drum and then taking the small pieces out of the container together with hot water. Use of the rotary drum is preferable because the continuous operation of the step B and the step C is easy and the treatment of the resin substrates in a large amount is possible.

Step D

In the step C, the resin substrates from which the coating film layer has been peeled and removed substantially, are obtained. In the case of compact discs, there can be obtained discs which have elliptic shapes as a result of rolling in the step A and from which the coating film layer has been separated. The step D is a step of grinding the resin substrates obtained in the step C. Since presence of the small pieces of coating film during the grinding of the resin substrates may invite readhesion of the small pieces to the resin substrates, it is advantageous to beforehand remove the peeled small pieces of coating film as completely as possible.

In the step D, there is no particular restriction as to the means for grinding the resin substrates, and a means generally used for grinding a plastic plate is employed. An example thereof is a cutting-type or hammer-type grinder, and a cutting-type grinder is preferred because it generates a small amount of a fine powder. Particularly preferred is a cutting-type grinder having rotary blades and stationary blades and having a screen with round holes at the bottom. Use of this grinder makes it possible to obtain, from the resin substrates, only the small pieces of resin substrates which are low in fine powder content and which can pass through the screen.

In the small pieces of resin substrates obtained by grinding, the shape and size may be each uniform or random. An appropriate size is such that a substantial amount of the small pieces pass through round holes of 15 mm in diameter and 90% by weight of the small pieces do not pass through round holes of 2 mm in diameter. When the size of the small pieces of resin substrates is larger than the above range, effective removal of thin metal film component in the next step E is difficult. On the other hand, when the size of the small pieces is too small, the step of grinding becomes complicated and the handling of the resulting small pieces becomes troublesome. Thus, such sizes are not preferred.

Step E

In this step E, the small pieces of resin substrates obtained in the step D are brought into contact with hot water and the thin metal film component formed on the substrates is removed. In the step E, neither special apparatus nor special reagent is required, and a container (or a tank) of appropriate size and hot water are used.

In the step E, the small pieces of substrates obtained in the step D are brought into contact with hot water and the thin metal film component formed on the substrates Is removed. Further, in the step E, even the residual coating film layer which could not be removed in the steps A to D is removed almost completely.

Therefore, it is preferred that the small pieces of substrates and the hot water are allowed to flow in a container so that they can make effective contact and moreover the small pieces of substrates can intertwine with each other. The small pieces of substrates repeat mutual association and separation from each other. As a result, the thin metal film component formed on each substrate is easily removed from the substrate. In that case, the removal is further promoted by the action of the hot water.

In the step E, the temperature of the hot water is preferably 50 to 100° C., particularly preferably 70 to 95° C. When the temperature of the hot water is lower than 50° C., the time required for the removal of the thin metal film component tends to be longer. On the other hand, when the temperature is higher than 100° C., the apparatus used becomes complex and expensive because pressurization is necessary, and further, there arises the deterioration of resin. In the step E, the practical contact time between small pieces of substrates and hot water is generally 10 to 60 minutes, preferably 20 to 40 minutes.

It is sufficient that the hot water comprises water alone, but the hot water may comprise, besides water, other solvent which has no solvency for the resin of substrate and which is water-soluble, in an amount of 20% by weight or less, preferably 10% by weight or less. As such a solvent, an alcohol, a glycol or a ketone can be mentioned. When the resin of substrate is an aromatic polycarbonate, an alcohol is preferred.

The step E is conducted in such an apparatus that the small pieces of substrates repeat mutual association and separation from each other and contact between hot water and small pieces of substrates is possible. Specifically, the small pieces of substrates and the hot water are placed in a container, and stirring or rotation of the container is conducted so that the small pieces of substrates can repeat mutual association and separation from each other and contact between hot water and small pieces of substrates is allowed to take place in the container.

In the container in which the step E is conducted, the small pieces of substrates can repeat mutual association and separation from each other effectively by allowing each proportion of the small pieces of substrates and the hot water to fall in an appropriate range. Use of too large an amount of hot water achieves neither effective association and separation of small pieces of substrates nor sufficient contact.

The range is preferably 1 to 50% by weight, more preferably 2 to 30 % by weight, particularly preferably 3 to 20% by weight in terms of the weight of small pieces of substrates based on the total of small pieces of substrates and hot water.

In a preferred embodiment of the step E, a rotary drum is placed in a container, the small pieces of substrates and hot water are placed in the drum; the drum is rotated, whereby the small pieces of substrates are allowed to repeat mutual association and separation from each other and the small pieces of substrates are brought into contact with the hot water.

Suitable as the rotary drum is one having a large number of small holes in the side wall. The small holes in the side wall of the rotary drum serve to separate the removed thin metal film component out of the drum together with the hot water.

Use of the rotary drum is extremely effective also for continuous operation of the step E. That is, it is preferable that the rotary drum is placed in a container containing hot water; the small pieces of substrates are fed into the drum from one end of the drum; the drum is rotated; while the small pieces of substrates are allowed to repeat mutual association and separation from each other, the thin metal film component separated are discharged through the small holes formed in the side wall of the drum, together with the hot water; the substrates free from the thin metal film component and the coating film layer are taken out from the other end of the rotary drum.

Preferably, the rotary drum has such an internal structure that the small pieces of substrates fed into the drum are slowly moved from one end of the drum toward the other end by the rotation of the drum. Such a structure is preferably one having a spiral-shaped diaphragm(s) inside the drum. The rotary drum may be any of a vertical type, a horizontal type and an inclination type, but a horizontal type or a mild inclination type is advantageous.

The thin metal film component discharged through the small holes formed in the side wall of the rotary drum is taken out of the container together with the hot water, the solid component is separated from the hot water by filtration, and the hot water is returned to the container for reuse. Thus, circulation use of the hot water makes small the amount of the hot water used and, moreover, heat loss is small.

In the step E, when the thin metal film formed on each resin substrate is made of aluminum, it is presumed that most of the thin aluminum film dissolves in the hot water in the form of aluminum hydroxide and is removed in the form of a solution. It is not clear whether the thin aluminum film formed on the substrate is peeled and then dissolved in the hot water, or the film is removed by dissolution, or both of these phenomena take place. Anyhow, the step E can provide substrates almost completely free from the thin metal film.

It is presumed that the dissolution of thin aluminum film in hot water takes place partially in the step B as well.

Step F

This step F is a step of separating, from the small pieces of substrates, the thin metal film component separated in the step E and the residual coating film component together with hot water and recovering and obtaining the small pieces of substrates as a resin component.

In the step F, no special apparatus is required. That is, the thin metal film component detached from the small pieces of substrates can be easily separated from the small pieces of substrates together with hot water. As necessary, after the completion of the step E, water or hot water may be newly added to separate the thin metal film component from the small pieces of substrates. It is also possible to shower the separated small pieces of substrates with water or hot water to separate the residual thin metal film component from the small pieces.

It is advantageous that the step F can be conducted in the same apparatus (container) as used in the step E. That is, it is advantageous to bringing the small pieces of substrates with hot water (step E) and the separation of detached thin metal film component (step F), in one container, and it is particularly advantageous to conduct these steps in one container continuously.

In one practice of conducting the steps E and F continuously, the step E is conducted by using an apparatus constituted by a container and a rotary drum placed in the container, as mentioned in the step E, and the step F is conducted by discharging the detached thin metal film component out of the drum together with hot water through the small holes formed in the side wall of the drum and then taking the thin metal film component out of the container together with hot water. Use of the rotary drum is preferable because the continuous operation of the step E and the step F is easy and the treatment of the small pieces of substrates in a large amount is possible.

The steps A, B, C, D, E and F of the present invention can be conducted successively, and this is industrially advantageous.

By conducting the steps A to F of the present invention, it is possible to remove a coating layer selectively and efficiently from optical information recording media coated with a layer comprising a thin metal film and a printed coating film and to recover the resin substrate at a high recovery rate with low deterioration of the resin property.

In particular, the steps A to F of the present invention are simple to operate, require no complicated apparatuses, and can process a large amount of resin substrates with small apparatuses.

According to the studies conducted by the present inventors, it has been found that a combination of the following steps is excellent from the viewpoint of industrial process. That is, it is a process for recovering the resin contained in optical information recording media having either a thin metal film layer, a printed coating film layer, or a layer comprising a thin metal film and a printed coating film, coated on at least one side of a resin substrate, which comprises the following steps of:

(1) passing the recording media between at least one pair of rollers to roll them (step A), (2) feeding the rolled recording media into one end of a rotary drum having small holes, and bringing them into contact with hot water in the rotary drum while the rolled recording media are being intertwined with each other (step B), (3) separating a substantial amount of the coating film peeled from the recording media through the small holes of the rotary drum, and extracting the recording media from the other end of the rotary drum (step C), (4) grinding the obtained recording media (step D), (5) feeding the obtained small pieces of the recording media into one end of a rotary drum having small holes, and bringing the small pieces into contact with hot water in the rotary drum (step E), and (6) separating the thin metal film component peeled together with the hot water through the small holes of the rotary drum, and taking out the small pieces of recording media from the other end of the rotary drum (step F).

The small pieces of resin substrates recovered according to the present invention contain no coating layer, show substantially no deterioration in quality, and can be recycled by melting them as they are. Or, they can be mixed with the same or different kind of resin for use. In the case of a polycarbonate resin substrate, for example, the small pieces of the recovered resin substrate can be recycled as they are or as a mixture with the same or different kind of polycarbonate resin to obtain a molded product. Or, they can be recycled as a mixture with a thermoplastic resin such as ABS resin, polyester resin or the like to obtain a molded product.

EXAMPLES

The following examples will be given to further illustrate the present invention. The following test items were measured by the following methods.

(1) State of Peeling

The small pieces of substrates after the step F were observed visually for evaluating the state of the coating layer remaining after peeling of each substrate in three levels. The level 3 was taken as "pass".

Level 3: The coating layer is peeled completely.

Level 2: The coating layer remains unpeeled partially or in dots, or some layers of a multi-layered coating layer remain on the whole surface of substrate.

Level 1: The coating layer is not peeled at all.

(2) Appearance of Molded Product

The presence of foreign matter in molded product was examined visually.

(3) Impact Strength Value

A test sample having a thickness of ⅛ in. was measured for V-notched Izod impact strength in accordance with ASTM D 256.

(4) Average Molecular Weight

The viscosity-average molecular weight (M) of a polycarbonate resin was determined by using methylene chloride as a solvent, calculating the intrinsic viscosity $[\eta]$ from the following formula of Huggins:

$$\eta sp/c = [\eta] + k'[\eta]^2 c, \; k' = 0.45$$

and using the following formula of Schnell:

$$[\eta] = 1.23 \times 10^{-4} M^{0.83}$$

(5) Water Absorptivity

A square plate having a side length of 50±1 mm and thickness of 3±0.2 mm was dried for 24 hours in a thermostat maintained at 50° C. for conditioning and then allowed to cool in a desiccator. The resulting test sample was immersed in an immersing liquid (fresh distilled water) at 20° C. for 24 hours. Thereafter, the change in weight was measured to determine the water absorptivity of the sample.

Example 1

A resin substrate A (diameter: 12 cm) constituted by a polycarbonate resin substrate (thickness: 1.2 mm) having a viscosity-average molecular weight of 15,100 and a water absorptivity of 0.20% by weight and containing bisphenol A as a dihydric phenol component/an aluminum deposition layer (thickness: 0.1 μm)/a UV coat layer (thickness: 5 to 10 μm)/a label printing layer (thickness: 20 μm) was rolled by the use of a two-roll mill (a product of Ohtake Kikai Kogyo) having a gap between rolls of 0.4 mm and a surface temperature of 130° C. (step A). The rolling conditions were roll revolution at high speed side=16 rpm, roll revolution at low speed side=14 rpm, roll diameter=12 in., and roll width=24 in. The rolled resin substrate had a length (a diameter in a rolled direction) of 13.8 cm which was rolled to 1.15 times the original length, and the coating layer had cracks at the whole surface. Then, the rolled resin substrate was immersed in hot water of 90° C. for 5 minutes and the mixture was stirred while being allowed to swell. The proportion of the resin substrate at this point was 5% by weight of the total weight of the resin substrate and the hot water and mainly, the label printing layer and the protective coat layer were peeled (step B). Then, the resin substrate was washed with water to remove the peeled coating layer (step C). Thereafter, the resin substrate was ground by the grinder (of Horai K.K.) having rotary blades and stationary blades and having round holes of 8 mm in diameter (step D) at the bottom.

Ninety seven percent by weight of the small pieces of substrate obtained above did not pass through round holes of 2 mm in diameter.

The small pieces of substrate were immersed and stirred in hot water of 90° C. for 30 minutes mainly to remove the residual aluminum deposition component (step E). The proportion of the small pieces of substrate at this point was 15% by weight of the total of the small pieces of substrate and the hot water. Then, the aluminum deposition component detached from the small pieces of substrate was separated together with the hot water to recover the small pieces of transparent polycarbonate resin substrate (step F).

The obtained small pieces of polycarbonate resin substrate were pelletized in accordance with a commonly used method. The pellets were dried at 120° C. for 5 hours and then subjected to injection molding at 270° C. using an injection molding machine (of Nihon Seikosho K.K.) to form a test piece. No foreign matter was observed in the molded product, and no unevenness was found on the surface. The test sample had an impact value of 5 kgf·cm/cm and a viscosity-average molecular weight of 15,000, which were about the same as those of the initial polycarbonate resin.

Examples 2 and 3

An operation was conducted in the same manner as in Example 1 except that the resin plates and conditions shown in Table 1 were used. The results are shown in Table 1.

The resin plates used in Tables 1 to 3 had the following compositions.

Resin plate A: substrate/aluminum deposition layer/UV coat layer/label printing layer Resin plate B: substrate/aluminum deposition layer/UV coat layer Resin plate C: label printing layer/substrate/aluminum deposition layer/UV coat layer/label printing layer Resin plate D: substrate/aluminum deposition layer/UV coat layer/label printing layer Resin plate E: substrate/aluminum deposition layer/UV coat layer/acrylic adhesive layer/UV coat layer/aluminum deposition layer/substrate In the resin plates A to C, the substrate has a thickness of 1.2 mm and is made of an aromatic polycarbonate resin (a product of Teijin Chemicals Ltd.) containing bisphenol A as a dihydric phenol component and having a water absorptivity of 0.20% by weight and a viscosity-average molecular weight of 15,100, the aluminum deposition layer has a thickness of 0.1 $\mu$m, the UV coat layer (protective coat layer) has a thickness of 5 to 10 $\mu$m, and the label printing layer has a thickness of 20 $\mu$m.

In the resin plate D, the substrate is made of a copolycarbonate resin having a viscosity-average molecular weight of 15,000 and a water absorptivity of 0.19% by weight. The dihydric phenol component of the copolycarbonate resin consists of 70 mole % of bisphenol A and 30 mole % of 1,1-bis-(4-hydroxyphenyl)-3,3,5-trimethylcyclohexane.

In the resin plate E, the substrate has a thickness of 0.6 mm and is made of an aromatic polycarbonate (a product of Teijin Chemicals Ltd.) containing bisphenol A as a dihydric phenol component and having a water absorptivity of 0.20% by weight and a viscosity-average molecular weight of 15,100, the aluminum deposition layer has a thickness of 0.1 $\mu$m, the UV coat layer (protective coat layer) has a thickness of 5 to 10 $\mu$m. These two sheets were laminated with an acrylic-type UV-curing adhesive to a total thickness of 1.2 mm in such a manner that the aromatic polycarbonate was at the both sides of the resulting laminate.

TABLE 1

| Resin plate | Example 1 A | Example 2 B | Example 3 C |
|---|---|---|---|
| Step A | | | |
| Difference in circumferential speed between rolls (cm/sec) | 3.2 | 3.2 | 3.2 |
| Step A Gap between rolls (mm) | 0.4 | 0.3 | 0.4 |
| Step A Roll terperature (° C.) | 130 | 110 | 120 |

TABLE 1-continued

| Resin plate | Example 1 A | Example 2 B | Example 3 C |
|---|---|---|---|
| Step A | | | |
| [(Length after rolling)/(original length)] of resin plate | 1.15 | 1.19 | 1.17 |
| Step B | | | |
| Water temp. (° C.) | 90 | 90 | 90 |
| Time (min) | 5 | 10 | 10 |
| Proportion of resin plate (wt %) | 5 | 5 | 5 |
| Step E | | | |
| Water temp. (° C.) | 90 | 90 | 90 |
| Time (min) | 30 | 30 | 30 |
| Proportion of small pieces of substrate (wt %) | 15 | 10 | 10 |
| State of peeling | 3 | 3 | 3 |
| Appearance of molded product (foreign matter) | Absent | Absent | Absent |
| Impact value (kgf · cm/cm) | 5 | 5 | 5 |
| Average molecular weight (× 10³) | 15.0 | 15.0 | 15.0 |

Examples 4 to 7

An operation was conducted in the same manner as in Example 1 except that there was used a two-roll mill of equal revolution speed (roll diameter: 12 in.) (a product of Ohtake Kikai Kogyo) as a roll mill, the revolution speed of the rolls was 14 rpm, and the resin plates and conditions shown in Table 2 were used. The results are shown in Table 2.

TABLE 2

| Resin plate | Example 4 A | Example 5 B | Example 6 D | Example 7 E |
|---|---|---|---|---|
| Step A | | | | |
| Difference in circumferential speed between rolls (cm/sec) | Zero | Zero | Zero | Zero |
| Step A Gap between rolls (mm) | 0.4 | 0.3 | 0.4 | 0.3 |
| Step A Roll temperature (° C.) | 120 | 120 | 140 | 120 |
| Step A | | | | |
| [(Length after rolling)/(original length)] of resin plate | 1.12 | 1.17 | 1.14 | 1.18 |
| Step B | | | | |
| Water temp. (° C.) | 90 | 80 | 90 | 90 |
| Time (min) | 10 | 15 | 10 | 10 |
| Proportion of resin plate (wt %) | 5 | 8 | 5 | 5 |
| Step E | | | | |
| Water temp. (° C.) | 90 | 90 | 90 | 90 |
| Time (min) | 30 | 40 | 30 | 40 |
| Proportion of small pieces of substrate (wt %) | 10 | 10 | 15 | 15 |
| State of peeling | 3 | 3 | 3 | 3 |
| Appearance of molded product (foreign matter) | Absent | Absent | Absent | Absent |
| Impact value (kgf · cm/cm) | 5 | 5 | 5 | 4 |
| Average molecular weight (× 10³) | 15.0 | 15.0 | 15.0 | 15.0 |

Example 8

A resin substrate A constituted by a polycarbonate resin substrate (thickness: 1.2 mm) of Example 1 having a viscosity-average molecular weight of 15,100 and a water absorptivity of 0.20% by weight/an aluminum deposition layer (thickness: 0.1 μm)/a UV coat layer (thickness: 5 to 10 μm) /a label printing layer (thickness: 20 μm) was continuously fed into a washer and washed with hot water of 40° C. for 1.5 seconds to remove the dust present on the surface of the resin substrate. The resin substrate discharged from the washer was continuously rolled using a two-roll mill (of Ohtake Kikai Kogyo) having a roll gap of 0.2 mm and a surface temperature of 130° C. (step A). The rolling conditions were roll revolution at high speed side=16 rpm, roll revolution at low speed side=14 rpm, roll diameter=12 in., and roll width=24 in. The rolled resin substrate had a length of 15.8 cm in the rolled direction, which was 1.32 times the original length, and had cracks on the whole surface of the coating layer.

The rolled resin substrate was continuously carried and fed into one end of a rotary drum by a conveyor. This rotary drum had small holes of 17 mm in diameter in the side wall. The inside of the drum was divided into four sections by three weirs, and when the amount of the resin substrate present in one section reached a certain level, it was moved to the next section by the rotation of the drum. The drum revolution and the weirs were adjusted so that the rolled resin substrate could stay in the drum for 10 minutes, and the resin substrate was brought into contact with hot water of 80° C. so that the proportion of the resin substrate became 3% by weight of the total of the resin substrate and the hot water (step B). Thereafter, mainly the label printing layer and the protective coat layer were peeled from the resin substrate and separated, together with the hot water, through the small holes formed in the side wall of the drum (step C), and the resin substrate substantially free from the label printing layer and the protective coat layer was continuously discharged from the other end of the rotary drum. The discharged resin substrate was directly and continuously fed into a grinder (of Horai K.K.) having rotary blades and stationary blades and having a screen with round holes of 10 mm in diameter at the bottom to be ground (step D).

Ninety eight percent by weight of the small pieces of substrate obtained above did not pass through round holes of 2 mm in diameter. The small pieces of substrate discharged from the grinder was continuously fed into one end of a rotary drum. This rotary drum had small holes of 2 mm in diameter in the side wall and a spiral-shaped diaphragm inside.

The small pieces of substrate were brought into contact with hot water of 90° C. for 25 minutes in the rotary drum so that the proportion of the small pieces of substrate became 8% by weight of the total of the small pieces of substrate and the hot water (step E). Thereafter, mainly the aluminum deposition component was detached from the small pieces of substrate. The detached aluminum deposition component was separated together with the hot water through the small holes formed in the side wall of the rotary drum, and the transparent small pieces of substrate free from the coating layer were continuously discharged from the other end of the rotary drum (step F). At this point, the small pieces smaller than 2 mm of substrate were discharged as well, together with the hot water, from the rotary drum through the small holes. The transparent small pieces of substrate were continuously fed into one end of a centrifugal dryer of rotary drum type and subjected to dehydration and preliminary drying for 2 minutes with hot air of 125° C. blown into the rotary drum. The small pieces discharged from the other end of the rotary drum were carried into a hopper dryer to be dried at 120° C. for 5 hours. The thus obtained small pieces of substrate were subjected to injection molding at 270° C. using an injection molding machine (of Nihon Seikosho K.K.) to prepare a test sample.

Examples 9 and 10

An operation was conducted in the same manner as in Example 8 except that the resin plates and conditions shown in Table 3 were used. The results are shown in Table 3.

TABLE 3

|  | Example 8 | Example 9 | Example 10 |
|---|---|---|---|
| Resin plate | A | B | C |
| Step A |  |  |  |
| Difference in circumferential speed between rolls (cm/sec) | 3.2 | 3.2 | 3.2 |
| Step A Gap between rolls (mm) | 0.2 | 0.2 | 0.2 |
| Step A Roll temperature (° C.) | 130 | 120 | 120 |
| Step A [(Length after rolling)/(original length)] of resin plate | 1.32 | 1.25 | 1.35 |
| Step B |  |  |  |
| Water temp. (° C.) | 80 | 80 | 80 |
| Time (min) | 10 | 10 | 10 |
| Proportion of resin plate (wt %) | 3 | 5 | 5 |
| Step E |  |  |  |
| Water temp. (° C.) | 90 | 90 | 90 |
| Time (min) | 25 | 25 | 30 |
| Proportion of small pieces of substrate (wt %) | 8 | 10 | 10 |
| State of peeling | 3 | 3 | 3 |
| Appearance of molded product (foreign matter) | Absent | Absent | Absent |
| Impact value (kgf · cm/cm) | 5 | 5 | 5 |
| Average molecular weight (× $10^3$) | 15.0 | 15.0 | 15.0 |

Examples 11 to 14

An operation was conducted in the same manner as in Example 8 except that there was used a two-roll mill of equal revolution (roll diameter: 12 in.) (a product of Ohtake Kikai Kogyo) as a roll mill, the roll revolution of each roll was 14 rpm, and the resin plates and conditions shown in Table 4 were used. The results are shown in Table 4.

TABLE 4

|  | Example 11 | Example 12 | Example 13 | Example 14 |
|---|---|---|---|---|
| Resin plate | A | B | D | E |
| Step A |  |  |  |  |
| Difference in circumferential speed between rolls (cm/sec) | Zero | Zero | Zero | Zero |
| Step A Gap between rolls (mm) | 0.2 | 0.2 | 0.2 | 0.2 |
| Step A Roll temperature (° C.) | 120 | 120 | 120 | 120 |
| Step A [(Length after rolling)/(original length)] of resin plate | 1.31 | 1.23 | 1.30 | 1.33 |

TABLE 4-continued

| Resin plate | Example 11 A | Example 12 B | Example 13 D | Example 14 E |
|---|---|---|---|---|
| Step B | | | | |
| Water temp. (° C.) | 80 | 80 | 90 | 90 |
| Time (min) | 10 | 15 | 10 | 10 |
| Proportion of resin plate (wt %) | 3 | 5 | 5 | 5 |
| Step E | | | | |
| Water temp. (° C.) | 90 | 90 | 90 | 90 |
| Time (min) | 25 | 40 | 30 | 40 |
| Proportion of small pieces of substrate (wt %) | 8 | 10 | 10 | 10 |
| State of peeling | 3 | 3 | 3 | 3 |
| Appearance of molded product (foreign matter) | Absent | Absent | Absent | Absent |
| Impact value (kgf · cm/cm) | 5 | 5 | 5 | 4 |
| Average molecular weight ($\times 10^3$) | 15.0 | 15.0 | 15.0 | 15.0 |

Comparative Example 1

The resin plate A was finely ground without subjecting it to a rolling step, a step of bringing it into contact with hot water or any other steps, and pelletized in the same manner as in Example 1 to prepare a test sample. The results are shown in Table 5.

Comparative Example 2

The resin substrate A was brought into contact with hot water of 120° C. for 660 minutes without subjecting it to a rolling step. The obtained resin substrate was finely ground and pelletized in the same manner as in Example 1 to prepare a test sample. The results are shown in Table 5.

Comparative Example 3

The resin substrate A was subjected to the step B and its subsequent steps in the same manner as in Example 1 under the conditions shown in Table 5, without conducting a rolling step. The results are shown in Table 5.

Comparative Example 4

The resin substrate A was rolled in the same manner as in Example 1 under the conditions shown in Table 5. The rolled resin substrate was finely ground without bringing it into contact with hot water, and pelletized in the same manner as in Example 1 to prepare a test samples The results are shown in Table 5.

TABLE 5

| Resin plate | Comp. Ex.1 A | Comp. Ex.2 A | Comp. Ex.3 A | Comp. Ex.4 A |
|---|---|---|---|---|
| Step A | | | | |
| Difference in circumferential speed between rolls (cm/sec) | — | — | — | 3.2 |
| Step A Gap between rolls (min) | — | — | — | 0.8 |
| Step A Roll Temprature (° C.) | — | — | — | 100 |
| Step A [(Length after rolling)/(original length)] of resin plate | — | — | — | 1.06 |
| Step B | | | | |
| Water temp. (° C.) | — | 120 | 90 | — |
| Time (min) | — | 660 | 10 | — |
| Proportion of resin plate (wt %) | — | 5 | 5 | — |
| Step E | | | | |
| Water temp. (° C.) | — | — | 90 | — |
| Time (min) | — | — | 30 | — |
| Proportion of small pieces of substrate (wt %) | — | — | 15 | — |
| State of peeling | 1 | 1 | 1 | 2 |
| Appearance of molded product (foreign matter) | Present | Present | Present | Present |
| Impact value (kgf · cm/cm) | 1 | 2 | 2 | 2 |
| Average molecular weight ($\times 10^3$) | 14.8 | 14.0 | 14.8 | 15.0 |

Comp.Ex: Comparative Example

Effects of the Invention

The present invention makes it possible to easily recover and recycle the resin component contained in the optical information recording media that have been considered virtually useless and disposed as an industrial waste, contributes greatly to the growth of optical recording medium industry and to the recycling of resources from the viewpoint of the protection of global environment, and is very effective from industrially. Moreover, the process thereof is simple, generates no environmental pollution and is industrially advantageous.

What is claimed is:

1. A process for recovering the resin contained in optical information recording media having either a thin metal film layer, a printed coating film layer, or a layer comprising a thin matal film and a printed coating film, coated on at least one side of a resin substrate,
   which comprises the following steps of:
   (1) passing the recording media between at least one pair of rollers to roll them to a length of 1.08 to 2 times the original length (step A),
   (2) bringing the rolled recording media into contact with hot water (step B),
   (3) separating a substantial amount of the coating film peeled from the recording media (step C),
   (4) grinding the obtained recording media (step D),
   (5) bringing the obtained small pieces of the recording media into contact with hot water to detach the thin metal film component (step E), and
   (6) separating the detached thin metal film component and the hot water from the small pieces of the recording media to recover and obtain the small pieces of the recording media (step F).

2. The process of claim 1, wherein in the step B, the rolled recording media are brought into contact with hot water while being intertwined with each other.

3. The process of claim 1, wherein in the step E, the small pieces of recording media are brought into contact with the hot water while being intertwined with each other.

4. The process of claim 1, wherein the step B and the step C are conducted in the same container.

5. The process of claim 1, wherein the step B and the step C are conducted in a container equipped with a rotary drum having small holes in the side wall.

6. The process of claim 1, wherein the step E and the step F are conducted in the same container.

7. The process of claim 1, wherein the step E and the step F are conducted in a container equipped with a rotary drum having small holes in the side wall.

8. The process of claim 1, wherein a pair of rollers in the step A is at a temperature of 30 to 140° C.

9. The process of claim 1, wherein the temperature of the hot water in the step B is 50 to 100° C.

10. The process of claim 1, wherein the recording media and the hot water in the step B are brought into contact with other in such proportions that ensure that the weight of the recording media is 0.1 to 30% of the total weight of the recording media and the hot water.

11. The process of claim 1, wherein in the step C, the substantial amount of the peeled coating film is separated together with the hot water.

12. The process of claim 1, wherein the small pieces of the recording media ground in the step D substantially pass through round holes of 15 mm in diameter and 90% by weight or more of them do not pass through round holes of 2 mm in diameter.

13. The process of claim 1, wherein the temperature of the hot water in the step E is 50 to 100° C.

14. The process of claim 1, wherein the small pieces of the recording media are brought into contact with the hot water in the step E in such a proportion that the weight of the small pieces of the recording media is 1 to 50% of the total weight of both the small pieces of the recording media and the hot water.

15. The process of claim 1, wherein the step A, step B, step C, step D, step E and step F are conducted successively.

16. The process of claim 1, wherein the optical information recording media comprise a substrate formed of a polycarbonate resin, a polymethyl methacrylate resin or an amorphous cyclic polyolefin resin.

17. The process of claim 1, wherein the optical information recording media comprise a substrate formed of a polycarbonate resin.

18. The process of claim 1, wherein the optical information recording media are a compact disc having a thin aluminum metal film layer.

19. The process of claim 1, wherein the optical information recording media are a DVD having a thin aluminum metal film layer.

20. The process for recovering the resin contained in optical information recording media having either a thin metal film layer, a printed coating film layer, or a layer comprising a thin metal film and a printed coating film, coated on at least one side of a resin substrate, which comprises the following steps of:
(1) passing the recording media between at least one pair of rollers to roll them to a length of 1.08 to 2 times the original length (step A),
(2) feeding the rolled recording media into one end of a rotary drum having small holes, and bringing the media into contact with hot water in the rotary drum while the media are being intertwined with each other (step B),
(3) separating a substantial amount of the coating film peeled from the recording media through the small holes of the rotary drum, and extracting the recording media from the other end of the rotary drum (step C),
(4) grinding the obtained recording media (step D),
(5) feeding the obtained small pieces of the recording media into one end of a rotary drum having small holes, and bringing the small pieces into contact with hot water in the rotary drum (step E), and
(6) separating the thin metal film component peeled through the small holes of the rotary drum together with the hot water, and taking out the small pieces of the recording media from the other end of the rotary drum (step F).

21. The process of claim 21, wherein the rotary drum in the step B has such an internal structure that the recording media are moved from one end of the drum to the other end by the rotation of the drum.

22. The process of claim 21, wherein the rotary drum in the step E has such an internal structure that the small pieces of the recording media are moved from one end of the drum to the other end by the rotation of the drum.

23. The process of claim 21, wherein the temperature of the hot water in the step B is 50 to 100° C.

24. The process of claim 21, wherein in the step D, the recording media are ground into small pieces having such sizes that a substantial amount of the small pieces pass through round holes of 15 mm in diameter and 90% by weight or more of them do not pass through round holes of 2 mm in diameter.

25. The process of claim 21, wherein the temperature of the hot water in the step E is 50 to 100° C.

* * * * *